Aug. 14, 1928.
F. B. PFEIFFER
1,681,146
APPARATUS FOR CURING TIRES UNDER INTERNAL PRESSURE
Original Filed Feb. 23, 1923
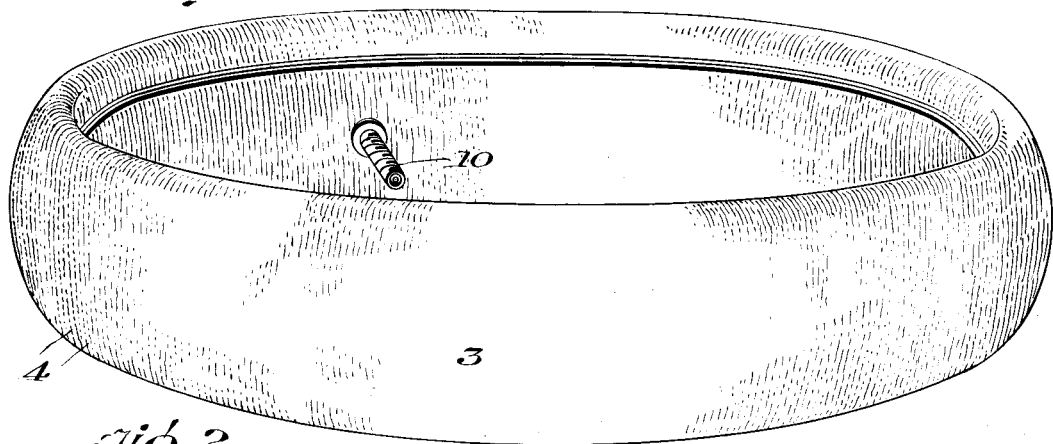
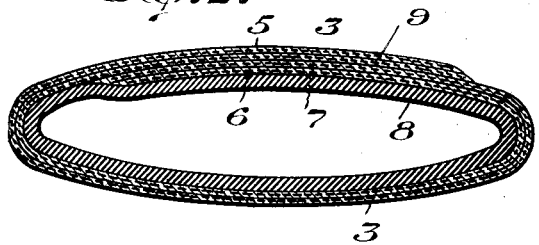
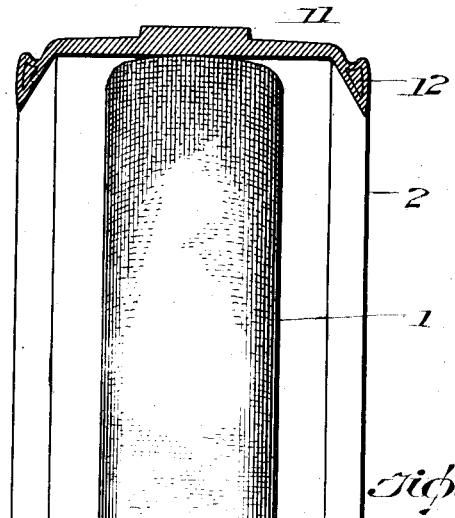
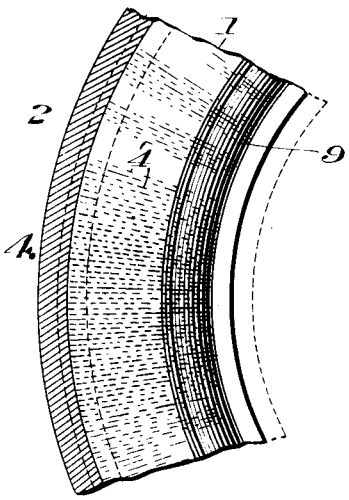
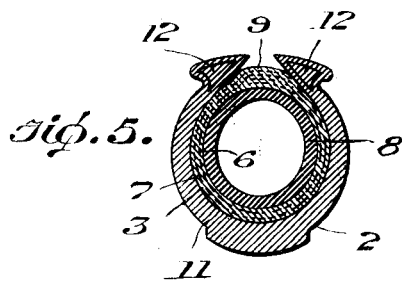
Inventor
Fred Brown Pfeiffer
By G. L. Cly
Attorney Patented Aug. 14, 1928.

1,681,146

UNITED STATES PATENT OFFICE.

FRED BROWN PFEIFFER, OF AKRON, OHIO.

APPARATUS FOR CURING TIRES UNDER INTERNAL PRESSURE.

Application filed February 23, 1923, Serial No. 620,701. Renewed June 16, 1928.

My invention relates to an apparatus for curing tires under internal fluid pressure of any suitable fluid such as air, water or steam, whereby improved results are obtained in the manufacture of these articles.

My invention relates to the inflatable cores or air bags for use in expanding and forming pneumatic tire casings which are so constructed as to obtain improved results in the curing of tires.

The general purpose of this invention is to provide an improved core for expanding the so-called "drum built" or "flat band" tire casings from a transversely flat annulus into the shape of a tire, whereby the principal expanding operation is performed without injuriously stretching or elongating the beads.

Heretofore an ordinary inner tube has been used for this purpose or an air bag constructed on the same principle as an inner tube with layers of fabric reinforcement arranged with its threads diagonally of the tube and crossing. Such tubes or bags in use prior to my invention expand under internal pressure in all directions from their longitudinal axis. They are commonly supported upon a core or rim to prevent them from expanding inwardly, but too much lateral expansion occurs and correspondingly less circumferential elongation. It is the latter action in the bag that is necessary to stretch or expand the flat band casing into the form of a tire and to bring the beads as close together as possible.

My invention is designed to provide an air bag in which the objectionable qualities of the ordinary bag are obviated so that a flat band casing may be expanded thereon to stretch it circumferentially throughout its tread portion.

Another purpose of my invention is to provide an air bag which will first expand into a fixed or predetermined rounded cross-sectional contour and then elongate throughout its outer circumferential portion.

Still another purpose of my invention is to provide a bag which will function in the manner above described without the use of a support so that it may be used without a chuck or stand and without the use of the usual bead clamping rings which are required to hold the beads as in processes in use prior to my invention.

Other objects and advantages, such as simplicity of construction and relatively low cost of manufacture, will presently appear when the following description is read and upon reference to the drawings and appended claims.

In the drawings which accompany and form a part of this specification:

Figure 1 is a perspective view of an air bag constructed in accordance with my invention;

Figure 2 is a transverse sectional view of the bag drawn on an enlarged scale;

Figure 3 is a view, partly in section and partly in elevation, illustrating the manner in which the tire is shaped by the use of the improved process using the improved expansible core;

Figure 4 is a fragmentary view, partly in section, further illustrating the operation of the invention; and Figure 5 is a transverse sectional view showing the bag and tire fully expanded.

In the drawings, the numeral 1 designates the air bag and 2 an unexpanded flat band casing mounted thereon, the bag being shown deflated in Figures 1, 2 and 3 and expanded in Figures 4 and 5.

The air bag 1 is constructed preferably in the form of an annulus. It comprises, in its broad aspect, a casing 3 of rubber or rubber composition reinforced at close intervals by transversely extending reinforcing elements such as cords 4 or other substantially inextensible units. The cords 4 are preferably disconnected one from the other and are arranged to additionally reinforce the inner circumferential portion 5 of the bag and preferably the casing 3 is increased in thickness throughout this latter portion.

I prefer to form the casing 3 of cord fabric such as is used in the construction of tires, although this is not essential to my invention. As best shown in Figure 2, the cord fabric is arranged in layers 6 and 7 laid around an ordinary inner tube 8 of rubber or rubber composition with the cords of the fabric extending transversely or at right angles to the plane of the tube and with the edges of the layers overlapping, as at 9, so that the cords 4 additionally reinforce the inner circumferential portion of the casing. The valve 10 of the inner tube projects through the layers 6 and 7 as shown in Figure 1. The bag thus formed is vulcanized to unite the overlapping edges of the layers and to form a composite structure of the layers 6 and 7 and the tube 8.

The casing is provided with its central or major portion in the form of a cylinder 11, and with its edges containing the usual beads 12 which in the form shown are the usual soft or stretchable clincher beads.

The action of this bag under internal pressure is as follows:

It is first distended to a substantially circular shape in cross-section as shown in dotted lines in Figure 3. The arrangement of the cords throughout the inner circumference of the bag and the increased thickness of rubber prevent lateral stretch throughout the zone of the bag and also longitudinal elongation to any material degree. The remainder of the bag is free to stretch laterally to the extent of stretch inherent in the cords, but the greater degree of stretch occurs throughout this portion in a longitudinal direction through separation of the cords into a fan-like formation as shown in Figure 4. This action of the cords permits the bag to elongate or stretch longitudinally throughout its outer circumferential portion so that said portion increases in circumference while the inner circumferential portion remains substantially fixed.

In shaping a flat tire band to tire form by expanding it, this is precisely the action desired as it is necessary that the beads and adjacent portions of the side-walls remain unstretched and that the tread zone of the band be elongated a considerable degree to bring it to the outer circumferential measurement of a tire. As before stated, it is difficult to accomplish this operation successfully with ordinary forms of air bags and by processes in use prior to my invention.

Although the foregoing description has been somewhat detailed in attempting to impart a clear understanding of my invention, it is not to be construed in a restrictive sense as changes and modifications may be resorted to within the spirit of the invention and the scope of the appended claims.

The core is especially adapted for the manufacture of tires having soft or stretchable beads as it prevents any elongation of the edges or bead portions of the casing. Heretofore, in the manufacture of such casings by expanding processes, whether the carcass was first made in the form of a flat band or on a transversely curved core, the beads have been stretched upon the exertion of the expanding pressure. This action is prevented or limited by the use of the core described, and it is not necessary to use any bead clamping rings.

What I claim is:

1. An air bag for use in bringing tires from a flat band condition to tire shape without exerting stretching action upon the beads of the tire, comprising an expansible core and a plurality of non-extensible reinforcing members about said core and arranged at right angles to the plane of the tire, the bag being free to expand circumferentially along its outer periphery, the reinforcing members being disconnected from one another so as to permit them to spread during the expansion of the bag, the bag being thickened along its inner periphery.

2. An air bag for use in shaping pneumatic tire casings, comprising an expansible tubular ring of rubber and a plurality of non-stretchable cords, all of which are parallel and arranged transversely of the tube, said cords being more numerous about the inner circumference of the tube than about its outer circumference, whereby the tube may expand circumferentially but be restricted from expansion tranversely.

FRED BROWN PFEIFFER.